K. A. READ.
VEHICLE WHEEL.
APPLICATION FILED APR. 24, 1911.
1,026,829.
Patented May 21, 1912.
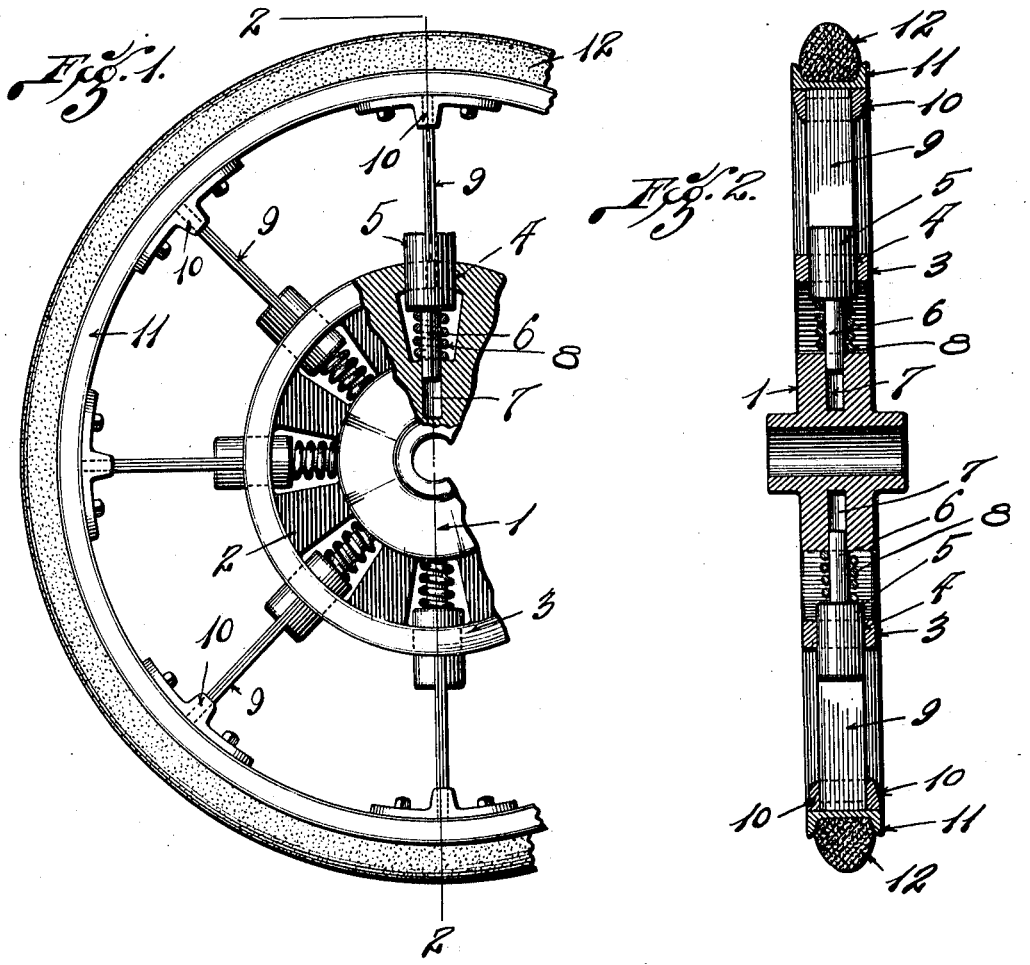
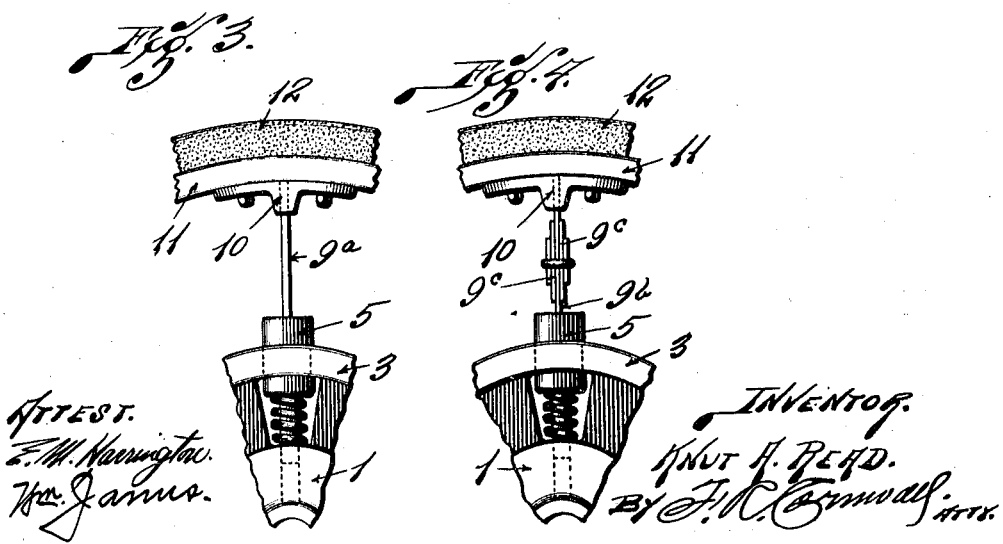

UNITED STATES PATENT OFFICE.

KNUT A. READ, OF OSKALOOSA, IOWA.

VEHICLE-WHEEL.

1,026,829.  Specification of Letters Patent.  Patented May 21, 1912.

Application filed April 24, 1911. Serial No. 623,036.

*To all whom it may concern:*

Be it known that I, KNUT A. READ, a subject of the King of Sweden, residing at Oskaloosa, Mahaska county, Iowa, have invented a certain new and useful Improvement in Vehicle-Wheels, of which the following is a full, clear, and exact description, such as will enable others skilled in the art to which it appertains to make and use the same, reference being had to the accompanying drawings, forming a part of this specification, in which—

Figure 1 is an elevation, broken away and in section, of a vehicle wheel of my improved construction. Fig. 2 is a vertical section taken on the line 2—2, Fig. 1. Fig. 3 is a detail view of a modified form of the flexible spoke used in my improved wheel. Fig. 4 is a detail view partly in section of a further modified form of the flexible spoke.

My invention relates to a vehicle wheel of the type wherein a solid rim or tire is combined with flexible spokes, the objects of my invention being to construct a wheel which depends for its resiliency upon a series of springs combined with other parts, to form yielding or flexible spokes, thus providing a wheel which possesses all the desirable characteristics of a pneumatic tire type of wheel without the liability of puncture and rapid wear incident to the use of pneumatic tires.

A further object of my invention is to produce a vehicle wheel which is characterized by great resiliency, strength, extreme durability combined with lightness of weight, which wheel can be cheaply manufactured and assembled.

To the above purposes, my invention consists in certain novel features of construction hereinafter more fully described and claimed.

Referring by numerals to the accompanying drawings, 1 designates the hub, and formed on or fixed thereto, is a series of radially arranged webs 2. Formed integral with or fixed to the outer ends of said webs is a solid ring 3, through which, between the webs 2, are formed openings 4, and arranged to slide freely through said openings are short rods 5, preferably round in cross section.

Formed integral with the inner end of each rod 5 is a stem portion 6 which projects through the openings between the webs 2, and the inner end of each stem is loosely seated in a corresponding recess 7 formed in the hub 1.

Located upon each stem 6 and interposed between the inner end of the corresponding rod 5 and the periphery of the hub 1 is a compression spring 8.

Seated in the outer end of each rod 5 are the inner ends of a series of flat leaf springs 9, and the outer ends of each series of these springs are seated in cups 10, which latter are carried by a solid rim 11. This rim is preferably formed of metal of any desired shape in cross section, and, if desired, may be equipped with a solid rubber tire 12, as shown in the drawings.

In Fig. 3 I have shown a modified form of the flexible spoke portion of the wheel wherein a single flat spring $9^a$ is utilized between the rod 5 and the cup 10, and it will be readily understood that where this particular construction is provided the single leaf spring is comparatively heavy and strong; but is yielding and pliable to such a degree as to give the proper resiliency when in service.

In the modified construction illustrated in Fig. 4, a single flat spring $9^b$ extends between each rod 5, and the corresponding cup or pocket 10, and this single spring $9^b$ is reinforced on each side by shorter leaf springs $9^c$.

By providing a wheel with yielding flexible spokes the entire rim portion of the wheel is yieldingly mounted upon the inner or hub portion, and ample resiliency for the load carried upon the axle is provided by the use of the springs 8 and 9. The springs 8 receive and oppose the direct radial inward thrust of the rods 5, and the springs 9 bend backward and forward upon lines parallel with the circumference of the wheel, and as said springs 9 are disposed with their width at right angles to the plane occupied by the circumference of the wheel, all tendency of the rim portion of the wheel to shift laterally, with respect to the hub portion, is done away with.

From the foregoing description, in connection with the illustration, it will be seen that I have provided a simple, durable and efficient construction of vehicle wheel wherein no pneumatic tire is used, while the characteristic of resiliency is retained, and the wearing qualities enhanced, and at the same time susceptibility of puncture and like disadvantages of a pneumatic tire wheel are avoided.

It will be readily understood that minor changes in the form, size and construction of the various parts of my wheel may be made and substituted for those herein shown and described without departing from the spirit of my invention, the scope of which is set forth in the appended claim.

I claim:

The herein described vehicle wheel comprising a hub in which is formed a series of radially arranged recesses, a web integral with the hub, in which web is formed openings communicating with the recesses in the hub, a ring integral with the edge of the web, in which ring is formed openings communicating with the openings in the web, a spoke body arranged for sliding movement in each of the openings in the ring, a stem integral with each spoke body, which stem extends into the corresponding recess in the hub, a coil spring mounted on each stem and bearing against the under side of the corresponding spoke body, a solid rim and series of sockets thereon a series of leaf springs carried by each spoke body, the outer ends of which leaf springs are loosely seated in the sockets and flexible tire applied to the rim.

In testimony whereof I hereunto affix my signature in the presence of two witnesses, this 20th day of April, 1911.

KNUT A. READ.

Witnesses:
HERMAN W. READ,
PETER F. CLARK.

---

Copies of this patent may be obtained for five cents each, by addressing the "Commissioner of Patents. Washington, D. C."